United States Patent [19]
Luetteke

[11] Patent Number: 5,282,677
[45] Date of Patent: Feb. 1, 1994

[54] ANTI-LOCK HYDRAULIC BRAKE SYSTEM

[75] Inventor: Harald Luetteke, Nieder-Rosbach, Fed. Rep. of Germany

[73] Assignee: Alfred Teves GmbH, Frankfurt am Main, Fed. Rep. of Germany

[21] Appl. No.: 838,438

[22] PCT Filed: May 10, 1991

[86] PCT No.: PCT/EP91/00876
    § 371 Date: Mar. 6, 1992
    § 102(e) Date: Mar. 6, 1992

[87] PCT Pub. No.: WO92/01591
    PCT Pub. Date: Feb. 6, 1992

[30] Foreign Application Priority Data

Jul. 26, 1990 [DE] Fed. Rep. of Germany ....... 4023708
Mar. 4, 1991 [DE] Fed. Rep. of Germany ....... 4106790

[51] Int. Cl.$^5$ .................................... B60T 13/18
[52] U.S. Cl. ..................... 303/116.2; 303/10
[58] Field of Search ............. 303/10, 11, 116.1, 116.2, 303/113.1, 113.2, 119.1, 115.1-115.4, 117.1, 900, 901, DIG. 1, DIG. 2

[56] References Cited

U.S. PATENT DOCUMENTS

| | | | |
|---|---|---|---|
| 4,828,338 | 5/1989 | Ocvirk et al. | 303/113.2 |
| 4,964,681 | 10/1990 | Burgdorf et al. | 303/115.4 |
| 5,178,442 | 1/1993 | Toda et al. | 303/119.1 X |

FOREIGN PATENT DOCUMENTS

| | | | |
|---|---|---|---|
| 0363845 | 4/1990 | European Pat. Off. | |
| 437208 | 7/1991 | European Pat. Off. | 303/113.2 |
| 3010639 | 9/1981 | Fed. Rep. of Germany | |
| 3538809 | 4/1986 | Fed. Rep. of Germany | 303/116.1 |
| 3603533 | 8/1986 | Fed. Rep. of Germany | |
| 3603560 | 11/1986 | Fed. Rep. of Germany | |
| 3711899 | 12/1987 | Fed. Rep. of Germany | |
| 3741266 | 6/1989 | Fed. Rep. of Germany | |
| 3842699 | 6/1990 | Fed. Rep. of Germany | 303/116.1 |
| 4003328 | 8/1991 | Fed. Rep. of Germany | 303/116.2 |
| 280507 | 7/1990 | German Democratic Rep. | |
| 2200552 | 8/1990 | Japan | 303/113.2 |

*Primary Examiner*—Robert J. Oberleitner
*Assistant Examiner*—Alfred Muratori
*Attorney, Agent, or Firm*—Robert P. Seitter; J. Gordon Lewis

[57] ABSTRACT

A hydraulic anti-lock brake system is disclosed in which the pressure in the wheel brakes can be regulated by means of an inlet valve and an outlet valve in response to the wheel rotational pattern. The wheel brake is supplied with pressure fluid out of the pumps through the inlet valve, and pressurized fluid is taken therefrom through the outlet valve. A differential pressure limiter (18) in front of the inlet valve (15) limits the difference in pressure allowed to build up across the inlet valve by closing a valve until a sufficient pressure build up occurs on the wheel brake. This considerably decreases the noise developed during valve operation. A pressure relief valve (30) insures that an evenly high pressure build-up takes place when the inlet valve (15) is closed by opening when a predetermined pressure difference develops across the inlet valve to allow a higher wheel brake pressure to equalize with the pressure upstream from the inlet valve.

11 Claims, 3 Drawing Sheets

ANTI-LOCK HYDRAULIC BRAKE SYSTEM

BACKGROUND OF THE INVENTION

The present invention relates to an anti-lock hydraulic brake system with at least one wheel brake and an auxiliary pressure source, wherein an inlet valve is inserted into the line between the auxiliary pressure source and the wheel brake and the wheel brake is connected to a return line via an outlet valve, wherein a differential pressure limiter is disposed within the line between the auxiliary pressure source and the inlet valve, the closure member of which is acted upon by both the force of a valve spring and the pressure in the wheel brake in a manner opening the line.

A brake system of this type is known from German published patent application 38 42 699.1. The latter describes a dual-circuit brake system with a tandem master cylinder and a pump for each brake circuit. The wheel brake cylinders each communicate via a respective inlet valve with the pressure line leading to the pump and, also with the brake line leading to the master brake cylinder. Each brake cylinder communicates via a respective outlet valve with the return line to the supply reservoir. Each inlet valve is normally open, while the outlet valves are normally closed.

The rotational behavior of the wheels is constantly monitored during a braking operation. In the event of an imminent locked condition of any one of the wheels, the drive of the pump is activated, and the inlet and outlet valves of the imminently locking wheel controlled such as to develop an amount of pressure in the wheel brakes which correlates with an optimal slip value of the wheel. To decrease the pressure, the outlet valve is opened and the inlet valve closed. Both valves are closed to retain the pressure, whilst for the pressure increase the inlet valve is open and the outlet valve is closed.

The inlet and the outlet valves are electromagnetically operated valves having a closure member which is seated on a valve seat.

Starting from a brake fluid pressure which is in excess of the pressure which corresponds to the force of the valve spring, a differential pressure limiter between the auxiliary pressure source and the inlet valve causes a defined constant pressure gradient to prevail on the inlet valve which is determined by the valve spring. This pressure gradient can be adjusted to 25 bar for example, and hence is considerably less than the pressure gradient which usually occurs when an emergency stop anti-lock controlled braking operation is performed by the brake system.

However, it has been discovered that dynamic actions in the return line and in the differential pressure limiter can cause the pressure in front of the inlet valve to build up to a level higher than what is desired.

Hence the present invention has for its object to develop measures ensuring that the pressure gradient at the inlet valve remains constant under all circumstances.

SUMMARY OF THE INVENTION

This object is achieved in that a pressure relief valve opening towards the wheel brake is connected in parallel to the inlet valve.

To realise the circuitry in a compact unit which conforms to all demands made on the stability of the control operation in the differential pressure limiter, the differential pressure limiter has a housing which incorporates three chambers, a control chamber, an inlet chamber, and an outlet chamber. A valve member is included comprised of a stepped piston furnished with an annular groove. The housing is provided with at least one port terminating into the annular groove of the stepped piston, and a piston part adjacent to the annular groove is slidable in the way of a valve slide to close the port.

The differential pressure limiting valve is thus designed as a valve slide which, in addition, permits the pressure relief valve to be incorporated in the piston of the valve slide.

DETAILED DESCRIPTION

Figure 1:
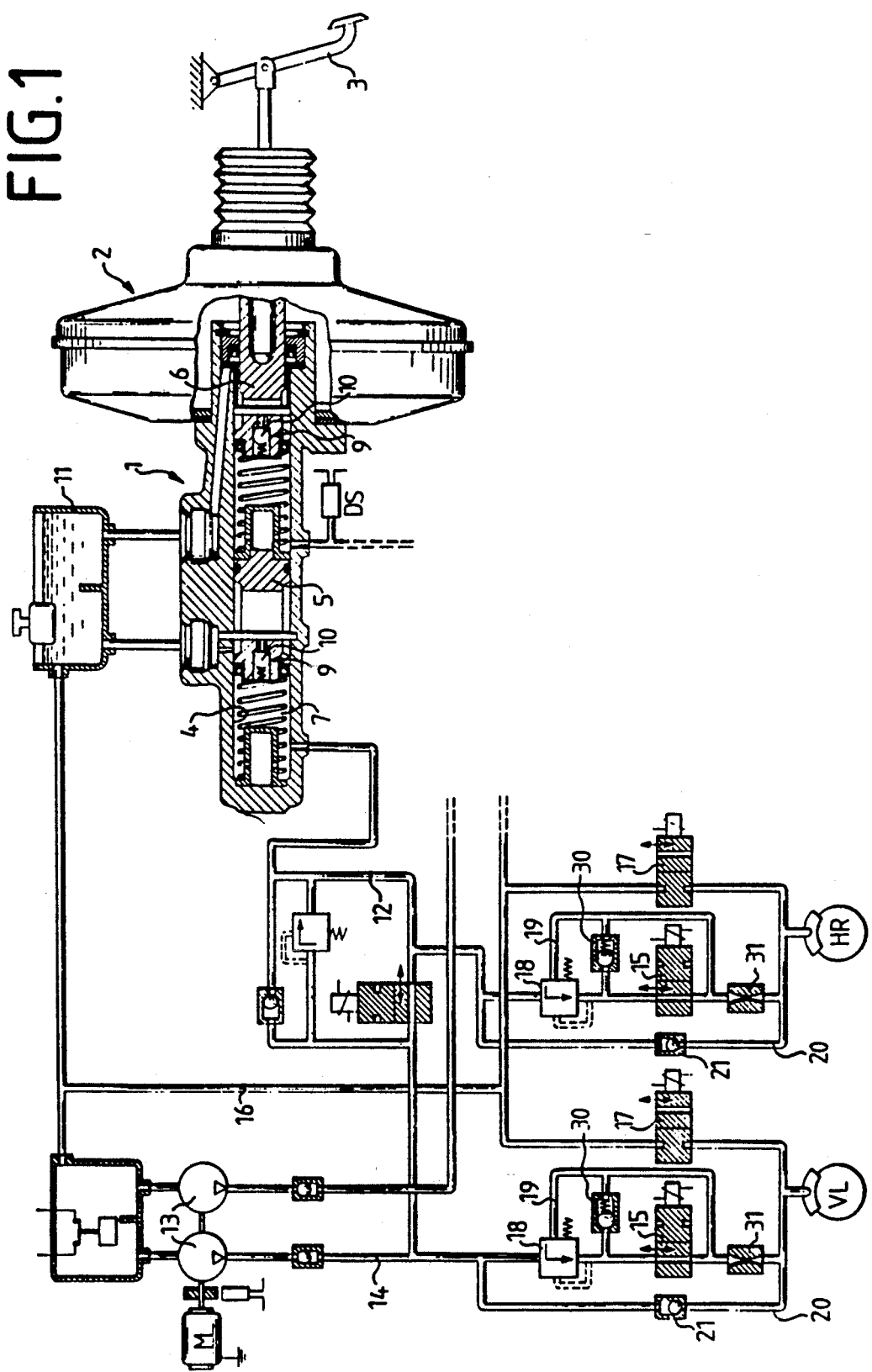
FIG. 1 is a hydraulic circuit diagram of the brake system including a master cylinder shown in cross-section.

The hydraulic brake system is composed of a master brake cylinder 1 connected to a pneumatic booster 2. The pneumatic booster 2 is in turn operated by a brake pedal 3. A floating piston 5 and a push rod piston 6 are sealing guided in the longitudinal bore 4 of the housing of the master brake cylinder 1. They define two working chambers 7 and 8 in the bore 4 of the master brake cylinder 1. Both the push rod piston 6 and the floating piston 5 comprise a central valve 9 whose closure member 10, in the initial position of the piston, is kept spaced from the valve seat by means of a tappet which is placed on a stop on the housing. Thereby, a connection is established between the working chambers 7 and 8 and the supply reservoir 11. When the driver depresses the pedal 3, the push rod piston 6 will be shifted into the master brake cylinder assisted by the pneumatic booster 2, in consequence whereof the central valve 9 closes and pressure fluid displaces out of the working chamber 8 into the connected brake circuit As a result, the floating displaces out of the working chamber 7 also. Both working chambers are in communication with the wheel brakes 32 of the vehicle via a brake line 12. The wheel brakes are referred to by a combination of letters, the following abbreviations being chosen: V for front, H for rear, L for left and R for right.

While only one brake circuit is shown, the non-illustrated circuit is of corresponding design.

The brake system also includes a double pump 13 which is driven by a motor M. The pumps 13 deliver fluid out of the supply reservoir 11 via each pressure line 14 into the brake lines 12. Inserted into each branch of the brake line 12 to the wheel brakes, is an inlet valve 15 which is operated electromagnetically and is open in its initial position.

The wheel brakes also communicate, via a return line 16, with the supply reservoir 11, with each outlet valve 17 being inserted into the return line 16. Each outlet valve 17 is likewise operated electromagnetically to be opened, and is closed in its de-energized state.

Upstream of each of the inlet valves 15, between the inlet valve 15 and the pump 13 and the master brake cylinder 1, is a differential pressure limiter 18 having a control line 19 connected directly to the respective wheel brake.

A non-return valve 21 closing towards the wheel brake is inserted into a by-pass line 20 in parallel to the inlet valve 15 and the differential pressure limiter 18.

Branching off from the control line 19 is a pressure relief valve 30 which connects the control line 19 with the brake line portion between the differential pressure limiter 18 and the inlet valve 15. The pressure relief valve 30 opens towards the control line.

A restrictor 31 which is normally integrated in the inlet valve is arranged directly beneath the control line's junction into the brake line for reasons of control characteristics.

Figure 2:
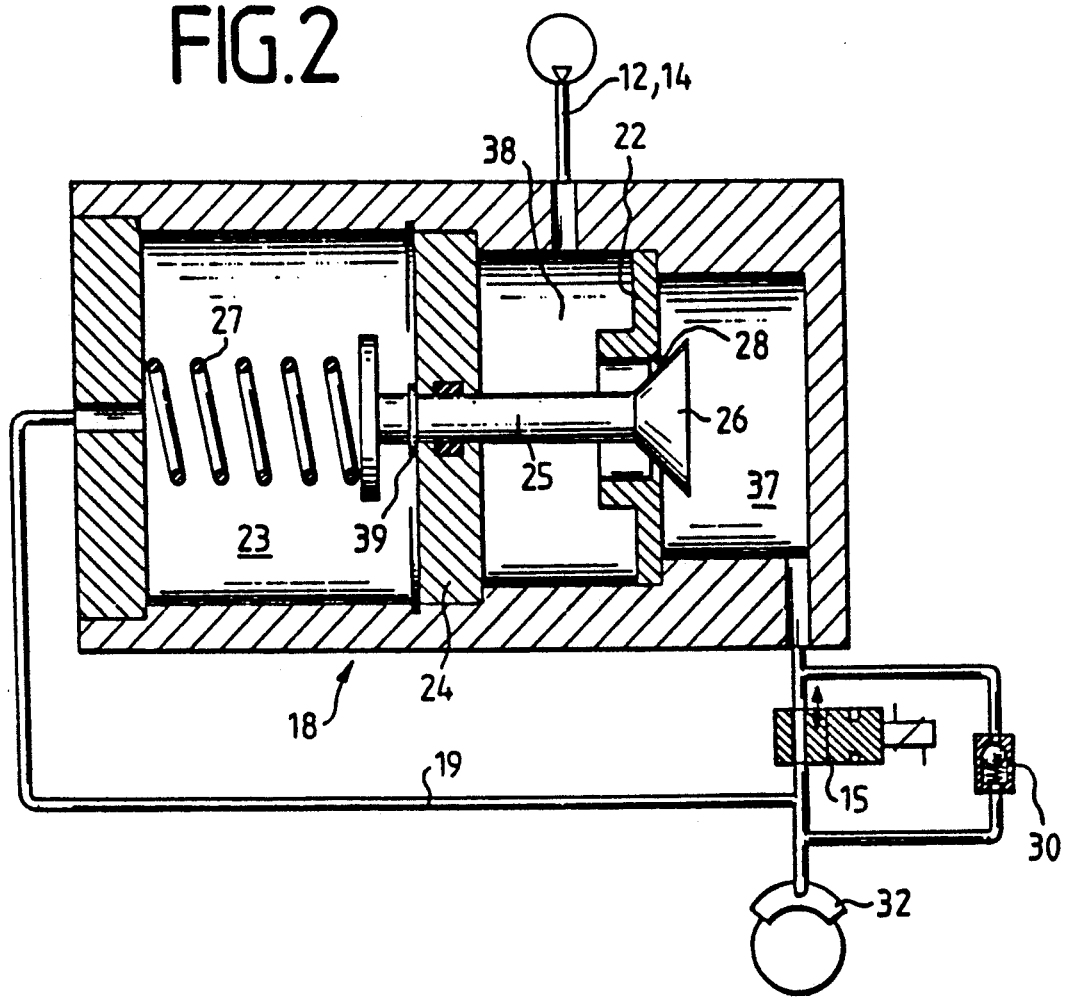
FIG. 2 is a cross sectional view of a first embodiment of a differential pressure limiter included in the brake system of FIG. 1.

The differential pressure limiter 18 is illustrated in more detail in FIG. 2. It is composed of a housing with three chambers arranged side by side. On the right hand in the illustration, there is the outlet chamber 37 which communicates via the inlet valve 15 with the wheel brake.

On the left hand of the outlet chamber 37, there is the inlet chamber 38 which communicates with the pressure line 14 and the brake line 12, respectively. The chambers 37 and 38 are isolated from each other by a wall 22, a central hole in the wall 22 forming the valve passage. To the left of the inlet chamber 38 is the control chamber 23 which, via the control line 19, is directly communicating with the wheel brake. A valve shaft 25 extends sealingly through the wall 24 between inlet chamber 38 and control chamber 23, which valve shaft projects through the central hole in the wall 22 into the outlet chamber 37. There it passes over into a valve closure member 26 of conical shape.

A valve spring 27 is arranged in the control chamber 23 and bears against the housing bottom, on one end, and on the valve shaft 25, on the other end. The valve spring 27 urges the shaft 25 against a stop 39, while in the basic position which is defined by the stop 39 the valve member 26 is held at a distance from the valve seat 28. In this event there is a free passage between the inlet chamber 38 and the outlet chamber 39.

The system operates in the following fashion:

In the initial position all parts assume their illustrated position, and the valves assume their illustrated switch positions. Operation of the pedal 3 causes pressure fluid to displace out of the working chambers 7 and 8 into the brake lines 12 via the open valves 15 to the wheel brakes, whereby pressure develops in the brake circuits which results in the brakes being applied and the vehicle being decelerated. The differential pressure limiter remains open, since the same amount of pressure prevails both in the outlet chamber 37 and in the control chamber 23. Hence the valve shaft 25 is force balanced with respect to the acting pressures so that the spring 27 is capable of keeping the valve 26, 28 open. The pressure relief valve 30 is likewise closed.

Once the pressure in the brake circuits is increased by the pedal force to the extent that the wheels tend to lock, the anti-lock mode will commence. The motor M of the pumps 13 is switched on and the inlet valve 15 closes. Now the pressure in the pressure line and, respectively, in the brake line can be increased without an increase in pressure in the wheel brakes. Since now the pressure in the outlet chamber 37 is in excess of that in the control chamber 23, a force acts upon the shaft 25 which works in opposition to the spring force and displaces the shaft to the left as viewed in FIG. 2. This causes the valve member 26 to sit on the valve seat 28, and the connection is closed between the inlet chamber 38 and the outlet chamber 37. The bias of the spring 27 may be adjusted, e.g., such that the valve will be closed in the presence of a difference in pressure of, e.g., 25 bar between the outlet chamber 37 and the control chamber 23. The pressure in the wheel brakes can be decreased still more by opening the outlet valve 17. If now, in order to cause pressure re-increase in the wheel brakes, the inlet valve 15 is opened, first the pressures in the outlet chamber 37 and the control chamber 23 will adapt again so that the valve passage of the differential pressure limiter will be opened and pressure fluid can flow out of the pump 13 into the wheel brakes as soon as the pressure difference amounts to 25 bar again.

It is essential that a defined constant pressure gradient is always adjusted by the differential pressure limiter 18 on the inlet valve 15, provided that the brake fluid pressure exceeds the pressure which corresponds to the force of the valve spring 27.

The pressure relief valve 30 prevents dynamic actions from causing the pressure in front of the inlet valve 15 to become higher than that in the wheel brake by more than roughly 25 bar. That is should this situation occur, the pressure relief valve 30 will open and effect a corresponding pressure compensation. It will be ensured thereby that an evenly high pressure build-up takes place in front of the inlet valve 15 when the inlet valve 15 is closed.

Figure 3:
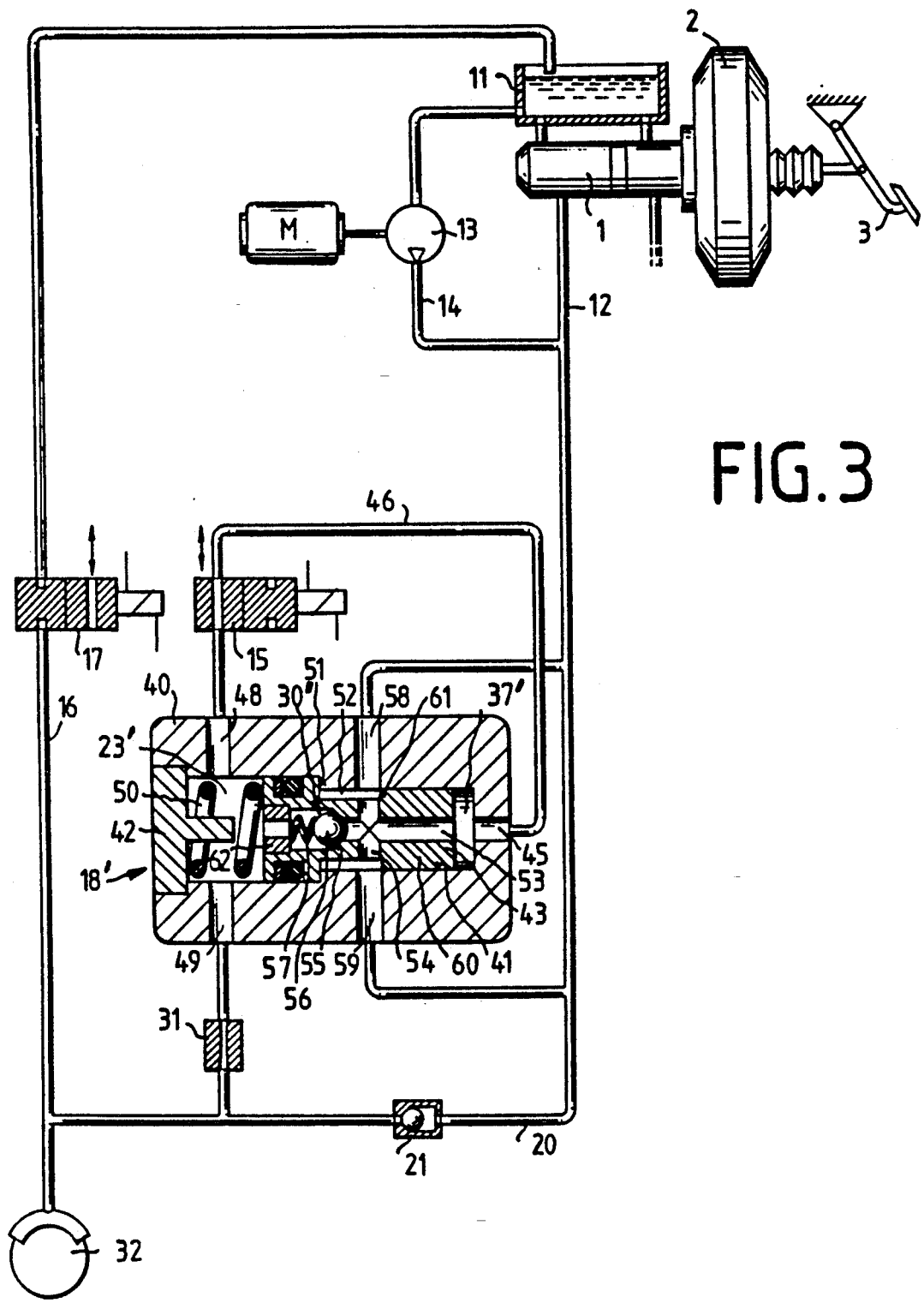
FIG. 3 is a cross sectional view of a second embodiment of the differential pressure limiter included in the brake system of FIG. 1.

The illustration according to FIG. 3 corresponds to that one of FIG. 1 as regards the valve switching arrangement. Like reference numerals have been used hence. In addition, the following applies:

The brake line portion 46 between the differential pressure limiter 18 and the inlet valve 15 is connected with the control chamber 23 by means of a pressure relief valve 30'. The pressure relief valve 30' opens towards the control chamber 23'.

The restrictor 31 which is normally integrated in the inlet valve is interposed in the brake line directly downstream of the control chamber for reasons relating to the improvement of the control quality.

The differential pressure limiter 18' is accommodated in a housing 40 which includes a stepped blind-end bore 41. The smaller step is disposed farther inwardly, while the larger step opens to the outside and, respectively, is closed by a plug 42. A stepped piston 43 is guided in the blind-end bore and separates the outlet chamber 37 with its small-diameter portion in the smaller step of the blind-end bore, while with its larger-diameter portion it confines the control chamber 23' in the area of the larger step of the blind-end bore.

The control chamber 37' is in communication with the inlet valve 15 via a housing port 45 and a line 46. The line portion 46 is part of the brake line 12. The control chamber 23' is provided with a first port 48 which connects to the other side of the inlet valve and with a port 49 connecting to the wheel brake. A restrictor 31 is inserted between the port 49 and the wheel brake 4.

The control chamber 47 also accommodates the control spring 50 which is supported on the stepped piston 43, on one end, and on the plug 42, on the other end. The control spring 50 keeps the stepped piston 43 on a stop 51 which is formed by the step between the small and the larger portion of the stepped bore in this embodiment.

In the area of its small diameter, the stepped piston 43 is furnished with a circumferential groove 52 acting as inlet chamber 38. Hence, there is a port 58 which connects to the master brake cylinder. Another port 59 is also connected to the master brake cylinder and is opposed to the port 58 so that uniform pressurization takes place. A longitudinal bore 53 extends through the length of the stepped piston 43 and leads from the one end face at the outlet chamber 37' to the other end face at the control chamber 23'. A transverse bore 54 extends vertically to the longitudinal bore 53 and terminates on both sides into the groove 52 and crosses the longitudinal bore 53 in the axis of the piston 43. This way there is a connection between the groove 52 and the outlet chamber 37'.

The part of the longitudinal bore 53 leading to the control chamber 23' is provided with the pressure relief valve 30'. To this end, the longitudinal bore 53 includes a step which is designed as valve seat 55. Abutting on this valve seat 55 is a valve ball 56 which is held by means of a valve spring 57. The valve spring 57 is supported on an annular insert member 62 which is inserted into the one end face of the stepped piston 43. On the side close to the inlet chamber 37', the groove 52 is confined by a piston part 60 having a control edge 61. The control edge 61 is disposed directly in front of the ports 58 and 59 in the illustrated initial position of the stepped piston 43. Hence when the stepped piston 43 is displaced in opposition to the force of the spring 50, the control edge 61 will shift over the ports 58 and 59 so that the piston part 60 closes the ports and isolates the groove 52 from the master brake cylinder. The brake line 12 is interrupted thereby. The control edge 61 in conjunction with the ports 58, 59 thus acts as a valve.

Furthermore, the pressure difference between the outlet chamber 37' and the control chamber 23' is adjusted to a defined valve by the pressure relief valve 30.

The system operates in the following manner:

In the initial position all parts assume their illustrated position, and the valves assume their illustrated switch positions. Operation of the pedal 3 causes pressure fluid to displace out of the master brake cylinder 1 into the brake lines 12 via the open valves 15 to the wheel brakes, whereby pressure develops in the brake circuits which results in the brakes being applied and the vehicle being decelerated. The differential pressure limiter remains open, since the same amount of pressure prevails both in the outlet chamber 37' and in the control chamber 23'. Hence the stepped piston 43 is balanced in force with respect to the acting pressures so that the spring 50 is able to keep the valve elements 58, 59, 60 of the differential pressure limiter 18 open. The pressure relief valve 30' is likewise closed.

Once the pressure in the brake circuits is increased sufficiently by the pedal force that the wheels tend to lock, the anti-lock mode will commence. The drive of the pump 13 is switched on and the inlet valve 15 closes. Now the pressure in the pressure line and brake line can be increased without the pressure in the wheel brakes increasing. Since now the pressure in the outlet chamber 37' is in excess of that in the control chamber 23', a force acts upon the stepped piston 43 which works in opposition to the spring force and displaces the stepped piston to the left, according to the illustration of FIG. 3. This causes the piston part 60 to shift in front of the ports 58, 59, whereby the connection is closed between the master brake cylinder 1 and the outlet chamber 37'. The bias of the spring 50 may be adjusted e.g., such that the valve will be closed in the presence of a difference in pressure of e.g., 25 bar between the outlet chamber 37' and the control chamber 23'. The pressure in the wheel brakes can be decreased still more by opening the outlet valve 17. If now, in order to cause pressure re-increase in the wheel brakes, the inlet valve 15 is opened, first the pressures in the outlet chamber 37' and the control chamber 23' will adapt to one another again so that the valve elements 58, 59, 60 of the differential pressure limiter 18' will be opened by the control valve spring 50 and pressure fluid can flow out of the pump 13 into the wheel brakes.

It is essential that a defined constant pressure gradient is always adjusted by the differential pressure limiter on the inlet valve 15, provided that the brake fluid pressure exceeds the pressure which corresponds to the force of the valve spring 50.

The pressure relief valve 30' prevents dynamic actions from causing the pressure in front of the inlet valve becoming higher that in the wheel brake by more than roughly 25 bar. Should this situation occur, the pressure relief valve 30 will open and effect a corresponding pressure compensation. It will be ensured thereby that an evenly high pressure build-up takes place in front of the inlet valve 15 when the inlet valve 15 is closed.

The valve slide action safeguards a sufficiently precise regulation of the differential pressure. It is possible at the same time that a defined amount of leakage is adjusted on the piston part 60 so that a defined quantity of pressure fluid per time unit is flowing. When this quantity ensures roughly the fluid demand for the control, there is no need to switch the inlet valve 15, in consequence whereof the noise developing is diminished further.

I claim:

1. An anti-lock hydraulic brake system with at least one wheel brake and an auxiliary pressure source, a pressure line between said auxiliary pressure source and said wheel brake, an inlet valve in said pressure line, a return line, an outlet valve, said wheel brake connected to said return line via said outlet valve, a differential pressure limiter means disposed within said pressure line between said auxiliary pressure source and said inlet valve, said differential pressure limiter means including a closure member, a valve spring acting on said closure member, a control line extending in parallel to said pressure line and connected thereto downstream of said inlet valve causing said closure member to also be acted upon by the fluid pressure in said wheel brake to cause opening of said pressure line, wherein a pressure relief valve means opening towards the wheel brake is connected in parallel to said inlet valve, said pressure relief valve means opening communication past said inlet valve whenever a predetermined high pressure develops across said inlet valve.

2. A brake system as claimed in claim 1, wherein said brake system includes a pedal operated master brake cylinder having a working chamber connected by way of a brake line connected to said pressure line between said auxiliary pressure source and said differential pressure limiter.

3. A brake system as claimed in claim 1, wherein said return line terminates into a supply reservoir and said auxiliary pressure source comprises at least one pump supplying fluid out of said supply reservoir.

4. A brake system as claimed in claim 1, wherein said differential pressure limiter means includes a housing having partitions defining three chambers, a control chamber, an inlet chamber, and an outlet chamber, a passage between said inlet chamber and said outlet chamber, a valve member and a valve seat, said valve member and said valve seat arranged to be movable between positions opening and closing said passage, said valve member having a valve shaft extending through one of said partitions and into said control chamber, said valve shaft sealingly guided through said one partition between said inlet chamber and said control chamber.

5. A brake system as claimed in claim 4, wherein said control chamber is connected to said wheel brake, said inlet chamber is connected to said auxiliary pressure source, and said outlet chamber is connected via said inlet valve with said wheel brake.

6. A brake system as claimed in claim 4, wherein said control chamber houses said valve spring, said valve spring having one end engaged on said housing, and also having another end engaging said valve shaft, said valve spring urging said valve member away from said valve seat.

7. A brake system as claimed in claim 1, wherein a restrictor is arranged in said pressure line between the connection of said control line to said pressure line downstream of said inlet valve and said wheel brake.

8. A brake system as claimed in claim 1, wherein said differential pressure limiter means includes a housing defining three chambers, a control chamber, an inlet chamber, and an outlet chamber, in that said closure member is a stepped piston, an annular groove, said housing provided with at least one port terminating into said annular groove, and in that a piston part adjacent to said annular groove is slidable as a valve slide to close said port.

9. A brake system as claimed in claim 8, wherein said control chamber is connected to said wheel brake, said inlet chamber via said annular groove is connected to said auxiliary pressure source and said outlet chamber is connected via said inlet valve to said wheel brake.

10. A brake system as claimed in claim 8, wherein said stepped piston has a longitudinal bore and a transverse bore said longitudinal bore having respective portions connecting said groove with said outlet chamber and said control chamber, said pressure relief valve having a valve member and a valve seat, said valve member being inserted into said portion of said longitudinal bore connected to said control chamber, and said valve seat carried by said stepped piston.

11. A brake system as claimed 8, wherein said piston part has a slightly smaller diameter than the corresponding bore portion so that leakage flows past said piston port between said annular groove and said outlet chamber.

* * * * *